United States Patent [19]
Haratake

[11] 3,820,126
[45] June 25, 1974

[54] ELECTRICAL SYSTEMS FOR CONTROLLING CAMERA SHUTTERS

[75] Inventor: Yoshiharu Haratake, Niiza, Japan

[73] Assignee: Asahi Kogaku Kogyo Kabushiki Kaisha, Tokyo-to, Japan

[22] Filed: Dec. 15, 1972

[21] Appl. No.: 315,653

[30] Foreign Application Priority Data
Dec. 20, 1971  Japan.......................... 46-119407[U]
Dec. 20, 1971  Japan.......................... 46-119408[U]
Dec. 20, 1971  Japan.......................... 46-119409[U]

[52] U.S. Cl............................................354/24
[51] Int. Cl. .......................................... G03b 7/08
[58] Field of Search ................. 95/10 CT; 330/30 D

[56] References Cited
UNITED STATES PATENTS
3,625,124  12/1971  Miyakawa............................. 95/10
3,668,541  6/1972  Pease...................................... 330/30 X
3,695,157  10/1972  Miyakawa............................. 95/10

Primary Examiner—Samuel S. Matthews
Assistant Examiner—Michael L. Gellner
Attorney, Agent, or Firm—Steinberg & Blake

[57] ABSTRACT

An electrical system for controlling a camera shutter. The electrical system includes a memory capacitor charged according to such information as light intensity, diaphragm, aperture, and film speed. This memory capacitor is electrically connected with a timing capacitor to bias the latter, and the timing capacitor forms part of a logarithmic expansion circuit and is initially charged by a constant voltage power source circuit. The timing capacitor is discharged simultaneously with the opening of the camera shutter and an FET is electrically connected through the memory capacitor to the timing capacitor to be operated thereby, this FET being electrically connected to a trigger circuit for triggering the latter to control the operation of an electromagnet which in response to triggering of the trigger circuit brings about closing of the shutter. A control is provided for controlling the operation of at least one of the above circuits. Thus, in the case of the supply circuit for the timing capacitor and the trigger circuit the control will compensate for temperature fluctuation while in the case of the logarithmic expansion circuit the control will provide a linear discharge characteristic for the timing capacitor even though the discharge circuit for the latter includes an element such as a diode which has a non-linear characteristic.

9 Claims, 1 Drawing Figure

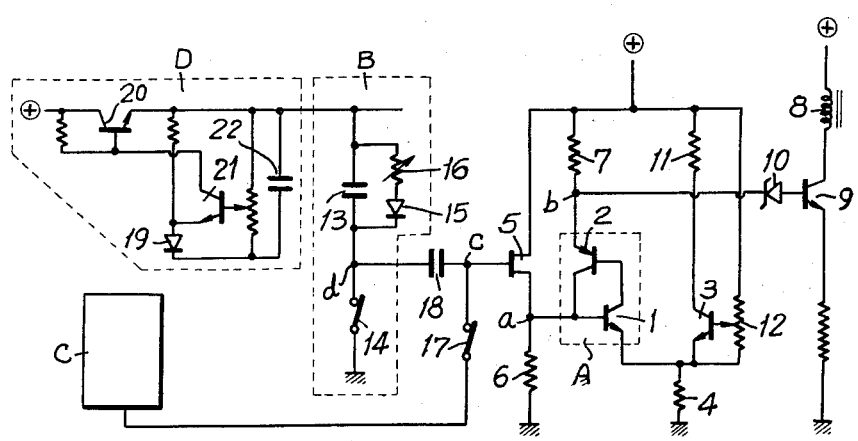

ELECTRICAL SYSTEMS FOR CONTROLLING CAMERA SHUTTERS

BACKGROUND OF THE INVENTION

The present invention relates to cameras.

In particular, the present invention relates to electrical systems used to control the shutter of a camera.

In general, circuits of this type include a power source circuit, a photoelectric transducer circuit, a delay circuit, a switching or trigger circuit, and an electromagnet circuit. Moreover, such electrical systems contain semiconductors such as transistors and silicon-controlled commutators or rectifiers, so that such systems are undesirably inclined to be influenced by temperature fluctuations at the area of the object which is to be photographed. The dependency of such systems on temperature fluctuations is a highly disadvantageous factor inasmuch as the systems will fail to achieve accurate exposure times due to the temperature fluctuations.

Although attempts have been made to compensate for the temperature fluctuations, a practical solution to the problem has not yet been achieved because the known solutions are extremely complex and highly expensive and because the temperature-compensating structure as known up to the present time is of such a large size that it cannot be readily accommodated in the limited space available in a camera.

A further problem encountered with respect to known electrical systems for controlling camera shutters resides in that part of the system which is used for timing purposes. Thus, for this purpose it is known to provide electrical systems of the above type with a timing capacitor the discharge of which will control the exposure time. One of the important requirements of electrical systems of this type is that the discharge of the timing capacitor be linear. However, the discharge circuit of such timing capacitors very often includes an element which has a non-linear characteristic, such as a diode, in order to apply information signals in accordance with the conditions under which a photograph is made to the timing capacitor. Because of the presence of such a non-linear element in the discharge circuit, the linearity of the discharge cannot be achieved. The result is that under certain conditions of operation this lack of linearity results in unavoidable inaccuracy. The lack of accuracy resulting from such a construction may be neglected at a lower speed of shutter operation but is a significant factor producing an error in connection with high speed shutter operation.

A further problem encountered with non-linear elements of the above type is that they all have different characteristics. They will normally be connected in parallel with a timing capacitor, and during production of cameras with systems of the above type it is desirable to select from the non-linear elements those which have operating characteristics which are as similar as possible. However, it is impossible to make the discharge characteristics of the selected elements identical for each shutter. Therefore, in connection with this difference between the non-linear elements there is also an error in the determination of the exposure time.

A further drawback with timing circuits of the above type resides in the fact that the non-linear element such as a diode will have fluctuating operations due to fluctuations in temperature. This problem in connection with such a non-linear element also creates a source of inaccuracy in the operation of the system. Thus, in connection with an element such as a diode included in the discharge circuit of a timing capacitor, there are two problems which up to the present time have not been satisfactorily solved, namely the problem with respect to the lack of linearity in the operation of such a diode and the problem in connection with inaccuracies due to temperature fluctuations when such a non-linear element is included in the discharge circuit.

SUMMARY OF THE INVENTION

It is accordingly a primary object of the present invention to provide an electrical camera shutter operating system which will avoid the above drawbacks.

In particular it is an object of the present invention to provide for a trigger circuit of an electrical system of the above type a control circuit which can readily be adjusted on the one hand to determine the level of operation of the trigger circuit and on the other hand to eliminate or reduce as much as possible the effect of temperature fluctuations.

In particular, it is an object of the present invention to achieve this latter result by way of a simple structure of extremely small size which can be readily accommodated in the space which is available in a camera.

A further object of the present invention is to provide for the timing circuit of an electrical system of the above type a construction which on the one hand enables a non-linear element such as a diode to be used in the discharge circuit of the timing capacitor and which on the other hand eliminates the drawbacks in connection with the non-linear operation of such an element.

Thus, it is an object of the present invention to provide a discharge circuit for a timing capacitor with a diode located in this circuit and also with a construction according to which the disadvantages resulting from lack of linearity in the diode are avoided.

Furthermore, it is an object of the present invention to provide for an electrical system of the above type a construction according to which the non-linear element in the discharge circuit of the timing capacitor will not introduce inaccuracies due to temperature fluctuations.

In particular, in connection with the latter possibility of inaccuracies resulting from temperature fluctuations, it is an object of the invention to provide for a system of the above type an exceedingly simple yet highly effective construction which will reliably eliminate any inaccuracies resulting from operation of a diode or the like in the discharge circuit for the timing capacitor due to temperature fluctuations.

In accordance with the invention the electrical system includes a memory capacitor means electrically connected with a signal-generating means which generates a signal according to such information as the light intensity, the diaphragm aperture, and the film speed, and the memory capacitor means is charged according to this latter signal. This memory capacitor means is electrically connected with a timing capacitor means, which forms part of a logarithmic expansion circuit means, for the purpose of biasing the timing capacitor means. A constant voltage power source circuit means is electrically connected to the timing capacitor means of the logarithmic expansion circuit means for charging the timing capacitor means with a given voltage. A capacitor-controlled means is electrically connected through the memory capacitor means to the timing capacitor means so that when the latter discharges the capacitor-controlled means will receive an input from the timing capacitor means as biased by the memory capacitor means. For this purpose the timing capacitor means can be electrically connected with a switch means which is operated simultaneously with the opening of the camera shutter to bring about discharge of the timing capacitor means. This capacitor-controlled means, which may be an FET having its gate connected to the memory capacitor means, has an output which is delivered to a trigger circuit means which responds when a given operating level is reached by the capacitor-controlled means to bring about through an electrical means an operation of an electromagnet in such a way that the electromagnet will initiate the closing of the shutter, and thus the exposure time will be determined in this way. At least one of the above three circuit means, namely the constant voltage power source circuit means, the logarithmic expansion circuit means, and the trigger circuit means, is electrically connected with a control means which controls the operation thereof. In the case of the logarithmic expansion circuit means, the timing capacitor means thereof is connected in parallel with a discharge circuit which includes a diode and a variable resistor connected in series with each other across the timing capacitor means, and this variable resistor is adjusted so as to eliminate the lack of linearity in the operation of the diode, thus achieving a linear rather than a non-linear characteristic cooperation. In the case of the trigger circuit, the control means takes the form of a transistor which serves as a voltage comparison circuit for one of a pair of transistors of the trigger circuit, the latter including a pair of transistors of different polarities which are connected to each other, and the transistor of the control means in connection with the trigger circuit means is thus a third transistor electrically connected with one of the transistors of the trigger circuit means to form a voltage comparison circuit therefor, and this third transistor has a variable resistor connected to its base so that it is possible to adjust the operation of the trigger circuit means in such a way that fluctuations due to temperature will be compensated, the third transistor having the same characteristics as that one of the pair of trigger circuit transistors to which it is connected, and at the same time it is possible to control the level at which the trigger circuit will respond to bring about actuation of the electromagnet means which determines the instant when the shutter closes. In the case of the constant voltage power supply circuit means, this latter circuit means has a control means in the form of a diode which has the same characteristics as the diode in the discharge circuit of the timing capacitor means with the electrical structure being such that as a result of this arrangement the diode in the constant voltage power source circuit means brings about a temperature compensating operation with respect to the diode which is in the discharge circuit of the timing capacitor, so that in this way also any inaccuracies due to temperature fluctuations are eliminated.

BRIEF DESCRIPTION OF DRAWING

The invention is illustrated by way of example in the accompanying drawing which shows in a simplified wiring diagram one possible example of an electrical system according to the present invention.

DESCRIPTION OF A PREFERRED EMBODIMENT

Referring to the drawing, there is illustrated therein, at the lower right portion thereof, a trigger circuit means A which includes two transistors 1 and 2 electrically connected to each other and having different polarities. Thus, one of these transistors is of the NPN type and the other is of the PNP type.

This trigger circuit means which is thus constituted by the interconnected transistors 1 and 2 of different polarities is electrically connected with a control means according to the invention, and this control means is formed by a third transistor 3 which has an emitter directly connected electrically with the emitter of the transistor 1, and in addition the transistor 3 has electrical characteristics which are equivalent to those of the transistor 1. These emitters of the transistors 1 and 3 are connected to a common junction to which there is also electrically connected an emitter resistance 4 which serves to determine the operating point of the trigger or switching circuit means A. The base of the transistor 1 forms the input for the trigger circuit means A and is electrically connected to a junction *a* which forms a junction between a fixed resistance 6 and an FET (field effect transistor) 5 the output of which is delivered to the trigger circuit means A through the connection at the junction *a*.

The emitter of the other transistor 2 of the trigger circuit means A forms the output for the trigger circuit means and is electrically connected to a constant resistance 7 by way of a junction *b* which is electrically connected through a constant voltage element such as a Zener diode 10 to the base of a transistor 9 which regulates the current which is applied to an electromagnet means 8 which determines when the shutter closes. Thus, the components 9, 10 form an electrical means through which the trigger circuit means A is electrically connected with the shutter-controlling electromagnet means 8, and through this electrical means 9, 10 the triggering of the trigger circuit means A will bring about an operation of the electromagnet means 8 which will result in closing of the shutter, in a manner which is described in greater detail below.

A fixed or constant resistor 11 is connected to the collector of the transistor 3. The resistance value of the resistor 11 is predetermined with respect to the resistance value of the resistor 7 in such a way that the resistance of the resistor 11 is greater than the resistance of the resistor 7.

The control means for the trigger circuit means A includes the transistor 3, as described above, and the base of the transistor 3 is electrically connected with a variable resistor 12 which is adjusted so as to achieve micro-regulation of the current between the collector and emitter of the transistor 3, and through this control means 3, 12 it is possible to adjust the response of the trigger circuit means A as well as to eliminate inaccuracies resulting from temperature fluctuations.

The electrical system of the invention further includes a logarithmic expansion circuit means B which operates to provide an electrical delay so as to determine the exposure time. For this purpose the logarithmic expansion circuit means B includes a timing capacitor means 13 electrically connected through a junction $d$ with a switch means 14 which acts as a timing switch means and which is connected as illustrated in series with the timing capacitor means 13. The switch means 14 is normally closed and in a well known manner is placed in its open position in synchronism with the opening of the shutter. The logarithmic expansion circuit means B further includes a discharge circuit connected in parallel with the timing capacitor means 13 across the latter, this discharge circuit including the diode 15 and the variable resistor 16 which are connected in series.

A signal generating means C, illustrated by the block at the lower left of the drawing, is provided to generate a signal in accordance with information such as light intensity, diaphragm aperture, and film speed. This signal generating means C is provided in a known way with a photoelectric transducer circuit, a logarithmic compression circuit, and a computation circuit for the factors of the selected diaphragm aperture and film speed. The signal generating means C is electrically connected directly to the gate of FET 5 way of a memory switch 17 which is a normally open switch. The junction $c$ to which the signal generating means C is electrically connected is situated between FET 5 and a memory capacitor means 18 which by way of the junction $d$ is also connected to the timing capacitor means 13.

A constant voltage power source circuit means D is electrically connected with the timing capacitor means 13 of the logarithmic expansion circuit means B for initially charging the timing capacitor means 13 with a given voltage, and this constant voltage power source circuit means D is provided with a diode 19 to compensate for temperature fluctuations. Thus, the diode 19 forms a control means for the constant voltage power source circuit means D, while the variable resistor 16 forms a control means for the logarithmic expansion circuit means B, and the transistor 3 together with the variable resistor 12 form a control means for the trigger circuit means A.

Assuming that the entire circuit is closed by way of a battery switch which is not illustrated, for example, just before the shutter is released, then the logarithmic expansion circuit means B will be energized from the constant voltage power source circuit means D, and at the same time the power source voltage is applied to the signal generating means C. In the illustrated example where the power source circuit means D is provided with a control means in the form of a diode 19 to compensate for temperature fluctuations, this power source circuit means D generates a constant voltage which will be higher or lower in accordance with the particular temperature at the field of the object which is to be photographed, so as to energize in this way the logarithmic expansion circuit means B.

The timing capacitor means 13 is charged when the timing switch means 14 is in its closed position and is kept at a constant voltage. When the memory switch 17 is closed, during an initial part of the depression of a shutter operating plunger of the camera, for example, a signal of the conditions under which the exposure will be made is transmitted from the signal generating means C to the gate of FET 5, which forms a capacitor-controlled means controlled through the memory capacitor means 18 by the timing capacitor means 13 which is biased by the memory capacitor means 18. Thus, upon closing of the switch 17 just prior to actual opening of the shutter, the memory capacitor means 18 will be charged in accordance with the signal which has the information corresponding to the light intensity, the diaphragm aperture, and the film speed. This will result in biasing the constant charge voltage of the timing capacitor means 13 with the charge voltage of the memory capacitor means 18.

The continued depression of the shutter-operating plunger of the camera will of course result in tripping of the shutter so that it will open, and simultaneously in a well known manner the switch means 14 is opened so that the biased timing capacitor means 13 will discharge through the discharge circuit which has the diode 15. As a result, the capacitor-controlled means 5 will be operated so that the gate voltage of the FET 5 rises due to the discharge of the timing capacitor means 13, and when this gate voltage reaches a predetermined value the trigger circuit means A will be triggered. Thus, when the gate voltage of FET 5 reaches a predetermined value, the potential at junction $a$ also rises so as to turn the trigger or switching circuit means A on, to bring about the triggering operation. The transistor 3 of the control means for the trigger circuit means A constitutes a voltage comparison circuit and has already been energized by the initial closing of the battery switch when the entire circuit is energized, or this transistor 3 may be energized when the shutter release is started, so that the transistor 3 has already been energized prior to the instant when the gate voltage FET 5 reaches the predetermined value at which the trigger circuit means A will be triggered. As a result it is possible to determine the operating point or trigger level of the switching circuit means A in accordance with the extent of voltage drop at the emitter resistance 4. It is also possible to determine this factor freely by adjusting the variable resistor 12 which is connected to the base of the transistor 3, this latter adjustment being provided so that the trigger circuit means A will be influenced to the minimum possible extent by temperature fluctuations.

As a result of the triggering of the trigger circuit means A, the potential at junction $b$ drops at the output of the trigger circuit means A very rapidly so as to render the transistor 9 non-conductive and thus bring about deenergizing of the electromagnet means 8 so as to initiate the shutter closing. Thus, the shutter is of the type which is maintained in its open position by the energized electromagnet 8. The force of the electromagnet 8 holds the shutter in its open position in opposition to the force of a spring, for example, which tends to close the shutter. Thus, at the instant when the electromagnet means 8 becomes unenergized, this spring will immediately respond so as to close the shutter.

As is apparent from the above, the trigger circuit means A can have the same operating characteristics as a switching element such as a silicon-controlled rectifier so as to operate the shutter rapidly and with great sensitivity. At the same time it is possible to determine freely the trigger level of the trigger circuit means A under conditions according to which the trigger circuit means A is influenced to the least possible extent by temperature fluctuations at the field where the object to be photographed is located or by ambient temperature fluctuations. This result is achieved because the trigger circuit means A has the pair of transistors 1 and 2 which are of different polarities and is electrically connected with the control means formed by the third transistor 3 which forms a voltage comparison circuit and which can freely determine the instant of operation of the trigger circuit means A. In addition, this third transistor 3 has the same operating characteristics as one of the transistors 1 and 2, namely the transistor 1 in the illustrated circuit, so that the dependency of these transistors of the same characteristics on temperature fluctuations is identical, and as a result even if the temperature in the field is higher so that the trigger circuit means A is more easily triggered by the input voltage, the operating level required for triggering the trigger circuit means A is made higher as a result of the temperature compensating effect, whereas if the temperature is lower so that it is more difficult to bring the trigger circuit means A to the trigger level, or in other words more voltage is required at the input to determine the triggering, the operating level of the trigger circuit means will have been lowered so as to provide an automatic compensation, thus bringing about rapid operation of the trigger circuit means without any undesirable influence resulting from temperature fluctuations.

Furthermore, since the trigger circuit means A is constituted by a pair of transistors which are coupled to each other and which have different polarities, there is the further advantage achieved with the present invention that the trigger circuit can have a smaller size than a silicon-controlled rectifier, for example, thus facilitating the accommodation of the trigger circuit means in the limited space which is available in a camera.

As is apparent from the above description, the timing capacitor 13 is biassed through the memory capacitor 18 according to the exposure conditions which include the light intensity at the object to be photographed, the aperture of the diaphragm, and the film speed, this timing capacitor means 13 being connected in parallel with the discharge circuit which includes the diode 15 which forms a non-linear element which in accordance with the invention is electrically connected with a control means formed by the variable resistor 16 connected in series with the diode 15, the timing capacitor means 13 discharging through the discharge circuit 15, 16 in synchronism with the opening of the shutter as a result of the opening of the switch means 14 simultaneously with the opening of the shutter. The variable resistor 16 is adjusted so as to eliminate any control error due to the lack of linearity of the diode 15 so as to achieve in this way an accurate exposure time even in a high-speed operating range of the shutter.

The elements 15, 16 and 13 together with the switch 14 form the logarithmic expansion circuit means B which is energized at a constant voltage from the power source circuit means D which is electrically connected to the input of the logarithmic expansion circuit means B. The power source circuit means D is provided with a control means formed by the temperature-compensating diode 19 which has the same characteristics as the timing capacitor means 13. Therefore, it is possible for the power source circuit means D to apply a lower constant voltage to the logarithmic expansion circuit means B when the temperature in the field of the object to be photographed is relatively high and a higher constant voltage to the logarithmic expansion circuit means B when this temperature is lower. The information with respect to the exposure conditions is stored by the memory capacitor means 18, as described above. Thus, with the electrical shutter system of the present invention the control of the exposure time is determined by the duration of discharge of the timing capacitor means 13 as biased by the memory capacitor means 18 in accordance with the exposure conditions. The discharge circuit of the timing capacitor means 13 which is constituted by a diode or non-linear element 15 and the variable resistor 16 is capable not only of providing linear discharge characteristics and eliminating any error in the exposure time due to the lack of linearity in the discharge, even in a high-speed shutter operating range, but in addition this structure extends the high-speed shutter operating range as a result of the greater accuracy in the shutter operation at the high-speed range. In addition, it will be noted that it is not necessary for the diode 15 of the discharge circuit to have the very same characteristics in each and every electrical system. It is possible to achieve the same operating characteristics for the several electrical systems by adjusting the variable resistor 16 so as to achieve in this way a more accurate operation of the shutter at the high-speed range and to avoid the troublesome and uneconomical work involved in selecting a proper diode or non-linear element to have the same characteristics for each electrical system.

Furthermore, as was pointed out above, the diode 19 forms a control means for the constant voltage power source circuit means D so as to achieve a temperature compensation according to the ambient temperature such as the temperature at the object to be photographed. As was indicated above, the diode 15 and the discharge circuit of the timing capacitor means 13 will introduce inaccuracies due to temperature fluctuations. However, with the present invention this undesirable influence is eliminated by controlling the output of the power source circuit means D in a manner which will compensate for temperature fluctuations. Thus, a non-linear element 19 such as a diode of PN type is incorporated into the circuit means D so as to lower the voltage used for charging the timing circuit if the ambient temperature such as, for example, the temperature of the field, is relatively high or to raise the voltage if the temperature is relatively low.

The constant voltage power source circuit means D which is connected to the input of the logarithmic expansion circuit means B includes a transistor 20 which is inserted into the power source current circuit and a second transistor 21 in order to detect variations in the power source voltage and vary or regulate the bias voltage of the transistor 20, this transistor 21 having its base connected to a variable resistor in a manner similar to the transistor 3 as described above. The diode 19 which forms the control means for the power source circuit means D is electrically connected to the emitter of the resistor 21 in such a way as to compensate for temperature fluctuations, and the power source circuit means further includes a capacitor 22 which is charged by way of the current regulated by the transistor 20. The terminal voltage of the capacitor 22 is applied to the logarithmic expansion circuit means B so as to charge the latter. The diode 19 is of the same temperature characteristics at least as the diode 15 in the discharge circuit of the timing capacitor means 13.

It will be noted that the emitter of transistor 2 of the trigger circuit means A is electrically connected through the fixed resistor 7 to the positive pole or anode of the power source.

As was indicated above, prior to actual opening of the shutter the entire circuit is closed as by closing a battery switch which is not illustrated, and thus the circuit means D supplies voltage to the logarithmic expansion circuit means B, with this voltage being controlled in accordance with the ambient temperature or the temperature at the field where the object to be photographed is located. The timing capacitor means 13 in the logarithmic expansion circuit means B is charged until its voltage is at the level of the voltage supplied from the power source circuit means D, this operation taking place while the switch means 14 is in its closed position. As was pointed out above, simultaneously with opening of the shutter the switch means 14 is opened so as to bring about discharge of the timing capacitor means 13 by way of the discharge circuit formed by the variable resistor 16 and the diode 15. As is apparent from the above description, the system of the invention will bias the electrical charge of timing capacitor means 13 in accordance with a predetermined voltage determined by the signal-generating means C and the memory capacitor means 18, in accordance with such conditions as light intensity at the object to be photographed, diaphragm aperture, and film speed, so that in this way there is a control for the exposure time in accordance with the time required for the timing capacitor means 13 to discharge to a given value. With such a system, the resistance value of the diode 15 in the discharge circuit will vary in accordance with fluctuations of the ambient temperature, so that under normal conditions there would be an error in the exposure time. For example if the temperature at the field at the object to be photographed is higher than a given normal or reference temperature, such as a given standard temperature, the resistance value of diode 15 will become smaller and the discharge time will be reduced. Therefore, the extent to which the discharge time is reduced because of these latter conditions can be considered as an error in the form of a reduction in the exposure time. On the other hand, if the resistance value of diode 15 is higher, due to the temperature conditions, the discharge time will be lengthened, thus introducing an error in the form an exposure time which is longer than required. In order to compensate for the variations in the resistance value according to the dependency of diode 15 on the ambient temperature, the supply voltage to the logarithmic expansion circuit means B is controlled in accordance with variations in ambient temperature such as the temperature at the object field or in accordance with a deviation from the standard temperature. For example, if the temperature at the field of the object to be photographed is higher than the standard temperature and the resistance of diode 15 lower, the voltage for charging the timing capacitor 13 will be reduced by the constant voltage power source circuit means D as a result of the presence of the control means formed by the compensating diode 19, in accordance with the extent to which the temperature is above the standard temperature, and thus the potential at the junction $d$ in the discharge line can be reduced so that even under these conditions the gate voltage of FET 5 requires a greater discharge and a longer discharge time in order to operate the trigger circuit means A and thus compensate for the influence due to dependency of the diode 15 on temperature. On the other hand, if the temperature at the field of the object to be photographed is lower than the standard temperature and the resistance of diode 15 is accordingly higher, the voltage for charging the timing capacitor 13 is raised by the constant voltage power source circuit means D as a result of the presence of the control means formed by the temperature-compensating diode 19, this extent to which the charge on the timing capacitor means 13 rises being determined by the extent to which the temperature is lower than the standard temperature, and thus potential at the junction $d$ can be higher. Therefore, the gate voltage requires a lesser discharge and a shorter discharge time in order to bring the trigger circuit A to the trigger level, and in this way there is a compensation for the temperature fluctuation.

thus, with the present invention the power source circuit means contains a non-linear element presenting temperature characteristics equivalent to the temperature characteristics of the non-linear element such as diode 15 in the discharge circuit of timing capacitor 13, so that this power source circuit means D will supply voltage to the timing circuit in such a way as to control the voltage in accordance with fluctuations of temperature such as the temperature at the field of the object to be photographed. Therefore with the present invention there is the advantage of eliminating automatically any difficulties or inaccuracies due to variation in resistance which will result in a non-linear element of the discharge circuit of the timing capacitor according to fluctuations of temperature, so that the timing circuit is regulated and there will be a minimum error in the exposure time as a result of dependency of the timing circuit on temperature fluctuations.

What is claimed is:

1. In an electrical system for controlling a camera shutter, memory capacitor means and signal-generating means electrically connected to said memory capacitor means for charging the latter according to an information signal determined by factors such as light intensity, diaphragm aperture, and film speed, timing capacitor means forming part of a logarithmic expansion circuit means and electrically connected with said memory capacitor means to be biased thereby, constant voltage power source circuit means electrically connected with said timing capacitor means for charging the latter with a constant voltage, switch means electrically connected with said timing capacitor means for commencing the discharge thereof simultaneously with the opening of a camera shutter, capacitor-controlled means electrically connected through said memory capacitor means with said timing capacitor means to be controlled by the discharge of said timing capacitor means as biased by said memory capacitor means, trigger circuit means electrically connected with said capacitor-controlled means to be triggered thereby, electromagnet means for determining the instant when the camera shutter closes, electrical means connected between said electromagnet means and said trigger circuit means for operating said electromagnet means to terminate the opening of the shutter in response to triggering of said trigger circuit means by said capacitor-controlled means, said logarithmic expansion circuit means including a diode and a variable resistor connected in series with each other, said diode and variable resistor being connected in parallel with said timing capacitor means across the latter to form a discharge circuit therefor, and said variable resistor being adjusted to provide a linear discharge characteristic for the discharge circuit of said timing capacitor means by operating essentially in the range of high shutter speeds.

2. The combination of claim 1 and further including control means electrically connected with said trigger means.

3. The combination of claim 2 and wherein said trigger circuit means includes a pair of transistors of different polarities electrically connected to each other, said control means including a third transistor electrically connected with one of said pair of transistors and forming a voltage comparison circuit.

4. The combination of claim 3 and wherein said third transistor has the same characterisitcs as one of said pair of transistors for compensating for temperature variations.

5. The combinations of claim 3 and wherein said one transistor and said third transistor respectively have emitters electrically connected to each other, an emitter resistance electrically connected to a junction between said emitters, and a variable resistor connected to the base of said third transistor for controlling the current between the collector and emitter thereof, so that said variable resistor can adjust said third transistor for determining the operation of said trigger circuit means and for providing for said third transistor characteristics which are the same as that of said one transistor for compensating for temperature variations.

6. The combination of claim 1 and further including control means electrically connected with said constant voltage power source circuit means.

7. The combination of claim 6 and wherein said control means is a diode connected into said constant voltage power source circuit means, said diode in said logarithmic expansion circuit means and said diode in said control means having equivalent temperature characteristics so that the voltage supplied by said constant voltage power source circuit means to said timing capacitor means is compensated for temperature variations.

8. The combination of claim 1 and wherein said capacitor-controlled means is an FET having an input gate electrically connected through said memory capacitor means to said timing capacitor means and having an output electrically connected to said trigger circuit means.

9. The combination of claim 8 and wherein said signal-generating means is electrically connected to a junction between said FET and said memory capacitor means.

* * * * *